United States Patent Office

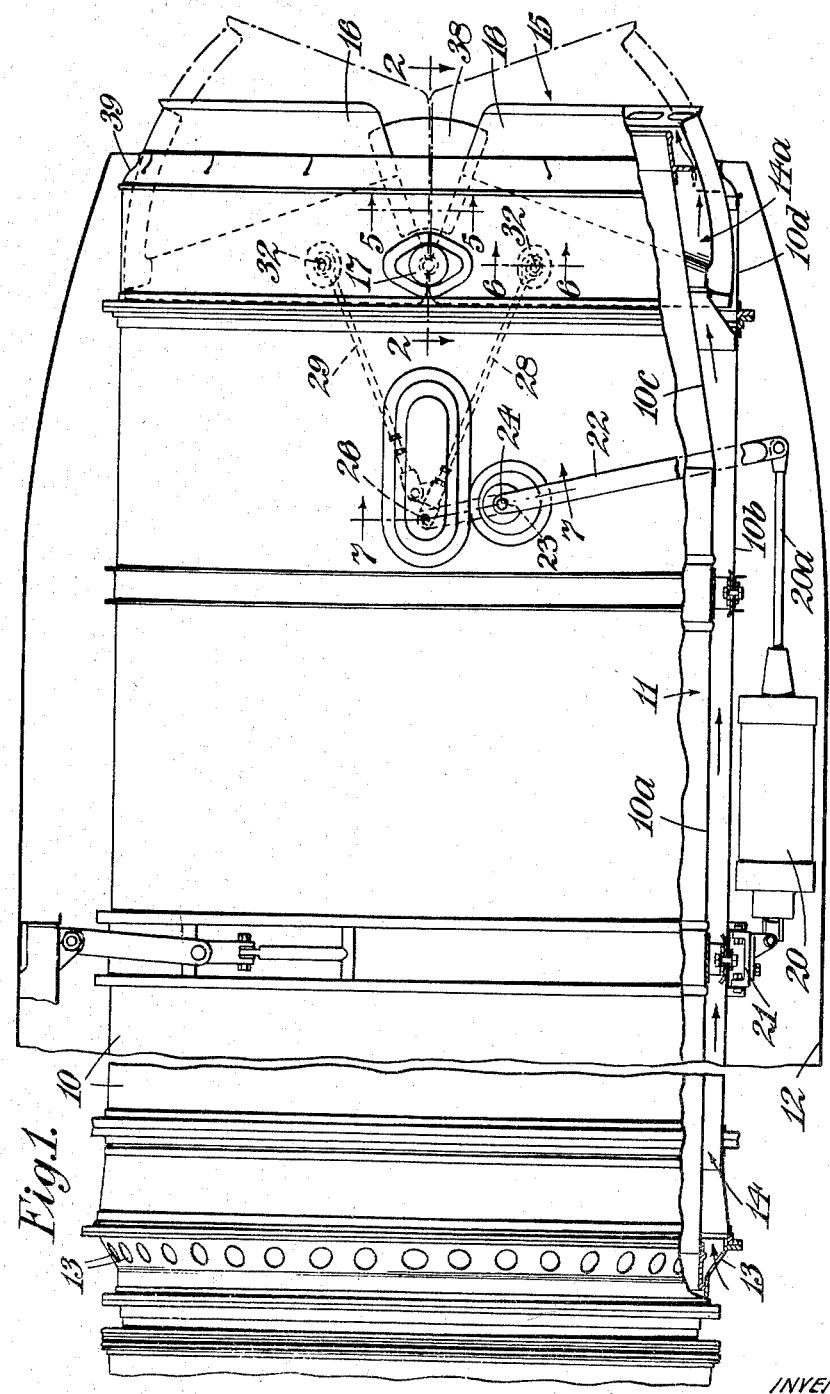

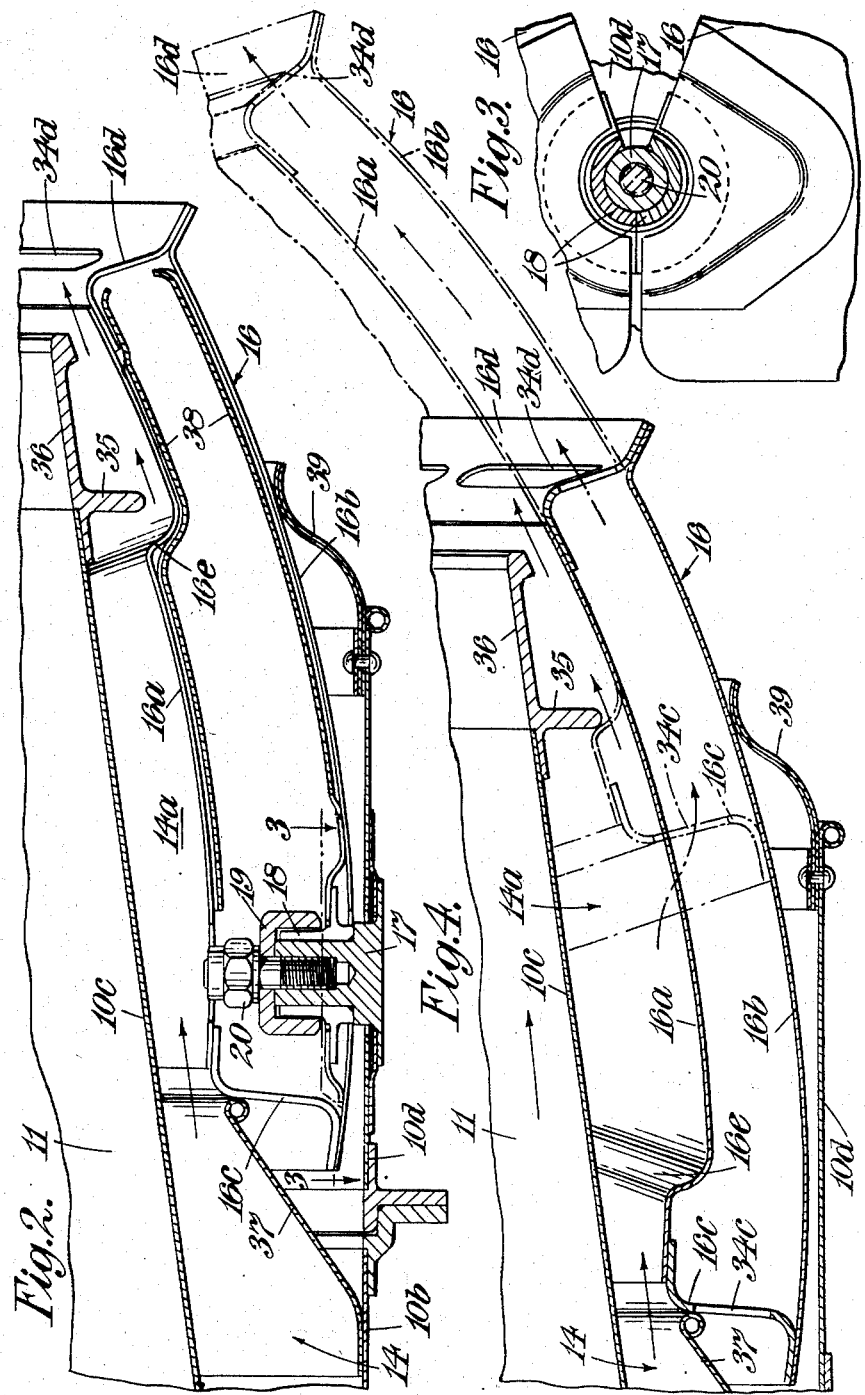

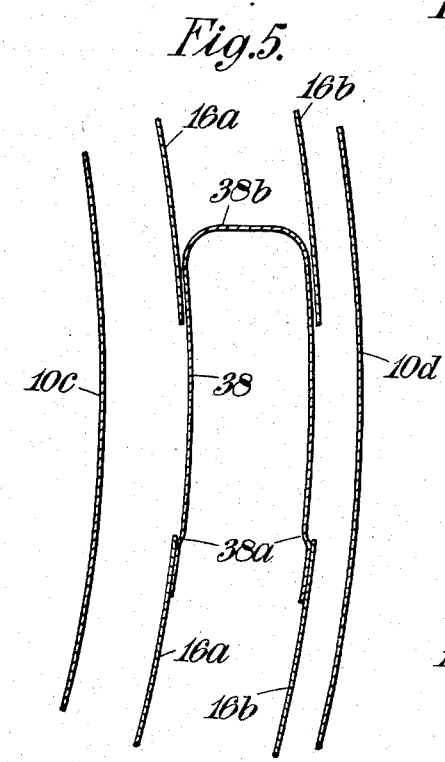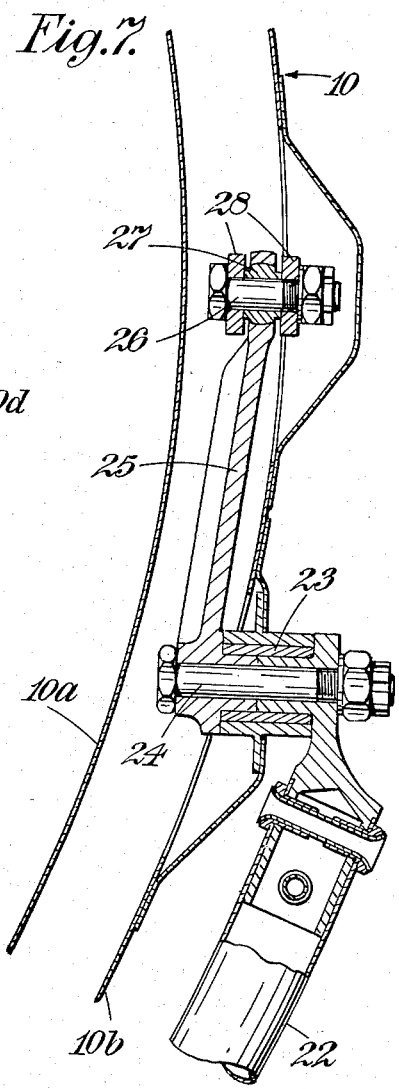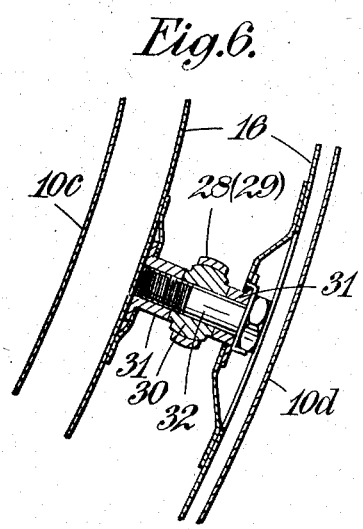

2,699,645
Patented Jan. 18, 1955

2,699,645

VARIABLE-AREA CONTROL FOR JET NOZZLES HAVING COOLING AIR MEANS

George Oulianoff, Allestree, and John Ranson, Littleover, England, assignors to Rolls-Royce Limited, Derby, England, a British company Application April 23, 1949, Serial No. 89,292

Claims priority, application Great Britain May 5, 1948

19 Claims. (Cl. 60—35.6)

This invention relates to jet-nozzles for gas-turbine propulsion units, such, for example, as are used on aircraft and has for an object to provide an improved construction of jet-nozzle of the kind having adjustable nozzle-portions for varying the orifice area of the nozzle.

One construction of jet-nozzle of this kind is described in British Patent No. 598,183 and comprises a pair of adjustable nozzle-portions each shaped internally as a half-zone of a sphere and pivoted to swing about a diameter of the sphere thereby to vary the orifice area. This construction of nozzle is simple and light since the direction of the resultant load due to the gas pressures acting on the inner surfaces of the nozzle-portions passes through the pivotal axis of the nozzle portions and therefore produces no turning movement tending to displace them.

In the operation of a gas-turbine-engine, the gases ejected through the nozzle are at a high temperature, especially if the fuel is being burnt in the jet-pipe to augment the thrust obtained. It is desirable therefore to cool the nozzle portions to avoid damage to them.

According to this invention, therefore, a jet-nozzle arrangement for a gas-turbine propulsion unit comprises a plurality of nozzle-portions mounted on the nozzle end of a jet-pipe and arranged for adjustment to vary the orifice area of the nozzle and is characterized by the nozzle portions being formed internally with passages having inlets thereto and outlets therefrom, said inlets and outlets being so located in the nozzle-portions that the passage of hot gases through the nozzle orifice induces a flow of cooling air through the passages in the nozzle-portions.

According to a feature of this invention, the nozzle-portions may be formed as a hollow sheet metal structure having spaced part-spherical inner and outer walls and arcuate leading and trailing end walls connecting the inner and outer walls, and having apertures provided in the leading end wall to form the air inlets and apertures in the trailing wall to provide the air outlets. The trailing wall will be located close to the high velocity jet issuing from the orifice, so that a flow of cooling air will be induced through the hollow nozzle-portions.

According to another feature of this invention, the jet-pipe may have a double-skin with the outer skin spaced from the inner skin with the nozzle-portions accommodated between the skins to project from said space to a varying extent according to their position of adjustment in varying the nozzle orifice area, the air inlets being located in the space between the skins so that in one position at least of the nozzle-portions the cooling air flowing through them flows also through the space between the skins.

In one such construction, the nozzle-portions are arranged to occupy a fully-retracted position and a fully-extended position, and sealing means is provided between the nozzle portions and the skins such that in the fully-retracted position the inlets are closed and the air flow induced between the skins passes between the inner skin and the nozzle portions and that in the fully-extended position a seal is completed between the inner skin and nozzle-portions and the inlets are uncovered whereby the cooling air is constrained to flow through the nozzle portions. A permanent seal is provided between the outer skin and the nozzle portions. The sealing means for closing the air inlets of the nozzle-portions may comprise an inwardly-directed flange on the outer skin against which the leading end walls of the nozzle-portions abut in the fully-retracted position. The seal which is made in the fully-extended position, may be effected by a shoulder on the inner wall of the nozzle-portions coming into contact with an outwardly directed flange on the inner skin.

In another such construction, the sealing means between the skins and nozzle-portions is arranged to be effective throughout the travel of the nozzle-portions so that the cooling air always flows through them. Such an arrangement is desirable when the nozzle-portions always define the orifice and are capable of occupying more than two positions.

One constructional embodiment of this invention will now be described with reference to the accompanying drawings in which:

Figure 1 is a general view of the rear portion of a jet-pipe fitted with a variable-area propelling nozzle, Figure 2 is a section on the line 2—2 of Figure 1 drawn on a larger scale, Figure 3 is a section on the line 3—3 of Figure 2, Figure 4 is a view on a larger scale of the bottom right-hand portion of Figure 1, Figure 5 is a section on the line 5—5 of Figure 1, Figure 6 is a section on the line 6—6 of Figure 1, and Figure 7 is a section on the line 7—7 of Figure 1.

The jet-pipe illustrated is suitable for use with an aircraft gas-turbine jet-propulsion engine of the kind in which fuel is burnt in the jet-pipe to augment the propulsive thrust of the jet, and will be connected with the gas-turbine engine through an exhaust pipe unit into which fuel is to be supplied to be burnt in the exhaust gases from the turbine.

The jet-pipe 10 has a sheet-metal inner skin 10a forming the boundary of the exhaust passage 11 and a sheet-metal outer skin 10b enclosing and spaced from the inner skin 10a to insulate the latter from the aircraft structure of which the engine nacelle 12 is indicated. Air inlets 13 are provided at the leading end of the outer skin 10b to admit air to the space 14 between the skins at the leading end of the double-skinned jet-pipe and the space 14 is open at the trailing end of the jet-pipe 10 to atmosphere. The trailing end of the jet-pipe is constituted by a jet-nozzle, generally indicated at 15, which is adjustable as to its orifice area so that the orifice area when fuel is being burnt in the jet-pipe is greater than the area of the orifice during normal operation of the engine.

The orifice area of the nozzle is adjusted by providing movable nozzle-portions 16 pivotally mounted on a convergent end portion 10c of the jet-pipe inner skin so as to be capable of being retracted into and extended from the space 14a between the convergent end portion 10c of the inner jet-pipe skin 10a and a substantially cylindrical end portion 10d of the outer jet-pipe skin.

In this construction a pair of such nozzle-portions 16 are provided. The nozzle-portions are formed as half zones of a sphere and are pivotally mounted on the cylindrical portion 10d of the outer skin 10b in the following manner. A pair of trunnion journals 17 (Figures 2 and 3) are mounted on the outer skin at diametrically opposite points thereof to project into the space 14a and each half zone nozzle-portion 16 has secured to it at each end an arcuate collar 18 which engages on the trunnion journal 17. The arcuate collars 18 of the adjacent ends of the nozzle-portions 16 bear on opposite sides of the trunnion journal and are retained in position by a cap 19 secured to the trunnion journal 17 by a threaded stud 20. The two nozzle-portions can in this way swing about a common axis which is a diameter of the jet-pipe and of the spherical half zones. As will be seen from Figure 3, abutment of the opposed surfaces of the arcuate collars 18 limits the extent to which the nozzle-portions can swing in either direction. Conveniently, the swinging axis of the nozzle-portions is the horizontal diameter of the sphere which is substantially at right angles to the jet-pipe axis so that one nozzle-portion 16 lies around the lower half of the jet-pipe and the other lies around the upper half of the jet-pipe. The adjacent circumferentially-facing ends of the nozzle-portions are tapered towards the trunnions to permit their swinging movement.

The swinging of the nozzle-portions 16 is controlled in any convenient manner. One suitable form of control comprises a hydraulic jack 20 mounted in the outer skin 10b by a bracket 21 located centrally beneath the jet-pipe exteriorly thereof and a control linkage between the jack 20 and the nozzle-portions 16. The linkage comprises a pair of arcuate levers 22 extending circumferentially around the jet-pipe 10 outside it and pivoted at their upper ends in bush bearings 23 located one on each side of the jet-pipe at points just below the horizontal central plane of the jet-pipe. The levers 22 are connected at their lower ends to the ram 20a of the jack 20 and at their upper ends are connected by bolts 24 to rocking arms 25 having at the free ends link pins 26 which are located substantially in the horizontal central plane of the jet-pipe 10 one on each side of the jet-pipe. The arms 25 (Figure 7) engage with the link pins 26 through spherical bushes 27 received in recesses in the ends of the arms. Each link pin 26 has pivoted to it a link 28 the end of which is bifucated to embrace bush 27 and which extends rearwardly from the link pin and is pivoted to the lower nozzle-portion at a point below the associated trunnion bearing. A second link 29 is pivoted to the link 28 and extends rearwardly to be pivoted to the upper nozzle-portion at a point above the trunnion bearing on that side of the jet-pipe. The links 28, 29 engage with the nozzle-portions 16 each through a spherical collar 30 (Figure 6) located between bosses 31 on the inner and outer walls of the nozzle portions by a bolt 32. As will be seen from Figures 6 and 7 the arms 25 and the links 28, 29 are accommodated between the inner skin 10a and the outer skin 10b. In operation, when the ram 20a of the jack is extended or retracted, the arcuate levers 22 and arms 25 are rocked on their pivots and the links 28, 29 displaced to cause the nozzle-portions 16 to swing about the trunnion bearings. The swinging movement can be limited either by controlling the travel of the ram or by abutment of the tapered end surfaces of the nozzle portions.

Since the temperatures prevailing in the jet-pipe during operation of the engine are very high, it is desirable to provide means for cooling the nozzle-portions 16 and also the jet-pipe 10.

For this purpose, each nozzle portion is formed as a hollow sheet metal structure having an inner wall 16a and an outer wall 16b of part-spherical form connected together by arcuate leading and trailing end walls 16c, 16d. Arcuate slots 34c, 34d are formed in the end walls 16c, 16d respectively to provide air inlet to and outlets from the interior of the nozzle portion 16.

The inner wall 16a is stepped to form an arcuate inwardly-directed shoulder 16e and in the extended position of the nozzle-portions, that is the position (shown in chain lines in Figure 4 occupied by the nozzle-portions when the orifice has its small area, these shoulders 16e abut against an outwardly-directed circumferential flange 35 formed on a cast-ring 36 secured to the frusto-conical portion 10c of the inner jet-pipe skin to form a seal preventing the passage of air through the space 14a between the inner skin and the nozzle-portions. A springy sealing strip 39 is carried by the outer skin portion 10d to engage with the outer wall 16b of the nozzle-portions 16. It will be clear that with the nozzle-portions 16 extended, the slots 34d in the trailing end wall 16d will be close to the high velocity gas stream issuing through the orifice so that a flow of cooling air will be induced through the space 14 between the skins 10a, 10b of the jet-pipe and through the interior of the nozzle portions 16 to cool them.

With the nozzle portions in the retracted position the shoulder 16e is clear of the flange 35 and a clear passage is left for the cooling air to flow through the space 14a between the inner wall of the nozzle portions and the inner jet-pipe skin portion 10c. Also the leading end walls 16c of the nozzle portions 16 abut against a baffle 37 which extends inwardly from the outer skin 10b part way across the air space 14 to close the slots 34c in the leading end wall 16c. Thus in the retracted position of the nozzle-portions, the induced air-flow occurs through the space 14a between the nozzle-portions 16 and the inner jet-pipe skin portion 10c.

It will be seen therefore that this invention provides a simple and effective means for cooling the nozzle-portions in both the extended and retracted positions.

Since the nozzle-portions 16 are cut-away at their adjacent circumferentially-facing ends, there will be tapering gaps (Figure 1) between them, and these gaps are filled by sheet-metal blanking pieces 38 which during the extension and retraction of the nozzle-portions telescope into and out from the nozzle-pieces 16. The facing ends of the nozzle-portions are open and the blanking pieces are made of U-form (Figure 5), and the open ends of the U-form pieces are jinked outwardly, that is, are formed with a double bend as indicated at 38a to engage firmly with the inner and outer walls of one nozzle piece whilst the base 38b of the U-form pieces can slide between the walls 16a, 16b of the other nozzle portion.

We claim:

1. A jet arrangement for a gas-turbine propulsion unit comprising a jet pipe having an inner skin and an outer skin member surrounding said inner skin so as to afford therebetween an annular space having an air inlet thereto; a nozzle at the outlet end of said jet pipe comprising a plurality of nozzle portions accommodated in part in said annular space and mounted on the outlet end of said jet pipe, said nozzle portions being formed with passages internally thereof which passages have inlets communicating with said annular space and outlets so located in the nozzle portions that the passage of hot gases through the nozzle orifice induces a flow of cooling air from said annular space through said passages; means for adjustably moving said nozzle portions to vary the orifice area of the nozzle; and co-operating gas-sealing means on said nozzle portions and said inner skin and on said nozzle portions and said outer skin arranged at least in the position of said nozzle portions defining a minimum orifice area to prevent leakage air flow between the surfaces of said nozzle-portions and the adjacent jet-pipe skins.

2. A jet-nozzle arrangement as claimed in claim 1, having said gas-sealing means arranged to prevent said leakage air flow in all positions of adjustment of the nozzle-portions as between a minimum and maximum orifice area.

3. A jet-nozzle arrangement as claimed in claim 1, in which each nozzle portion is formed as a hollow sheet metal structure having a part-spherical inner wall, a part-spherical outer wall spaced away from the inner wall to afford a passage therebetween, and apertured leading and trailing end walls interconnecting said inner and outer walls and affording respectively inlets to and outlets from the space between said walls, said nozzle portions being pivoted for adjustment about an axis which is a diameter of the jet pipe.

4. In a jet-nozzle arrangement for a gas-turbine propulsion unit of the class comprising a jet pipe and an adjustable nozzle structure on the outlet end of the jet pipe, a construction of said jet pipe and adjustable nozzle structure which comprises an inner jet pipe skin, and outer jet pipe skin around the inner skin and spaced therefrom to afford between the skins an annular air space extending lengthwise of the jet pipe, there being an air inlet into said annular air space and an air outlet from said annular air space adjacent the outlet end of the jet pipe, adjustable nozzle-portions mounted on the end of the jet pipe to be movable from a fully-extended position into said annular air space to vary the effective area of the nozzle, the leading part of the nozzle portions being always accommodated in said air space, said adjustable nozzle-portions having formed therein air passages leading from inlets in the leading parts of the nozzle-portions to outlets adjacent the exhaust gas stream carried by the jet nozzle arrangement, and co-operating gas-sealing parts on said jet pipe and said adjustable nozzle-portions which gas-sealing parts co-operate at least when the nozzle-portions are in said fully-extended position to prevent a flow of air from said annular air space between the surfaces of the nozzle-portions and said inner and outer skins but to permit a flow of air through said air passages from said annular air space to the outlets from said air passages.

5. A jet-nozzle arrangement as claimed in claim 4, wherein said co-operating gas-sealing parts comprise a resilient sealing strip carried by said outer skin and arranged to be in resilient contact with the outer surface of said nozzle-portions, and a part projecting outwardly from said inner skin to abut a shoulder on the inner surface of said nozzle-portions when said nozzle portions are in the fully extended position.

6. A jet-nozzle arrangement for a gas-turbine propulsion unit comprising a jet pipe having an inner skin and an outer skin, which skins are spaced apart to afford therebetween an annular air space having an inlet thereto and an outlet therefrom which outlet is located adjacent the outlet end of the jet pipe; a plurality of nozzle-portions mounted on the outlet end of the jet pipe and arranged to be moved into and out from said annular air space with the leading ends of said nozzle-portions always accommodated between said inner and outer jet pipe skins, between a fully-extended position in which said nozzle-portions determine the minimum effective area of said nozzle and a fully-retracted position in which said nozzle-portions are in-effective to determine the nozzle area, air passage means in said nozzle-portions having inlets thereto opening into said annular air space and outlets therefrom adjacent the trailing ends of said nozzle-portions; and co-operating gas-sealing parts on said nozzle-portions; and said inner and outer skins arranged in the fully-extended position of said nozzle-portions to prevent air flow from said annular air space except through said air passage means, and in the fully-retracted position of said nozzle-portions to prevent air flow through said air passage means but to permit air flow from said annular air space between said inner skin and the inner surface of said nozzle-portions.

7. A jet-pipe arrangement as claimed in claim 6, wherein said co-operating gas-sealing parts comprise a part projecting outwardly from said inner skin and co-operating abutment shoulders on the nozzle portions arranged to abut the outwardly projecting part only when said nozzle portions are in the fully extended position, a part carried by one of said skins and arranged in the fully-retracted position of said nozzle portions to close the inlets to said air passage means, and a part carried by the said outer skin and in continuous gas-sealing co-operation with the external surfaces of said nozzle-portions.

8. A jet-nozzle arrangement for a gas-turbine propulsion unit comprising a jet pipe for conveying hot gases from the unit to atmosphere, said jet pipe having an inner skin and an outer skin spaced from said inner skin to afford therebetween an annular air space, and adjustable nozzle-portions mounted on the end of the jet pipe for varying the effective area of the outlet from said jet pipe, said nozzle-portions having air passages formed internally thereof with inlets to said passages in the leading part of said nozzle-portions and outlets in the trailing parts of said nozzle-portions, said air passages communicating through said inlets with the annular air space between said inner and outer skins and said outlets being arranged so that the passage of hot gas through the nozzle structure induces a flow of cooling air from said annular air space through said air passages.

9. A jet-nozzle arrangement as claimed in claim 8, having the nozzle-portion spaced from the inner skin, and pivoted on the jet pipe to swing about an axis which is a diameter of the jet pipe between a fully-retracted position and fully-extended position, and comprising also a first sealing means arranged to close the inlets to the air passages formed in the nozzle-portions in the fully-retracted position only, and a second gas-sealing means arranged between the nozzle-portions and the jet pipe to prevent in the fully-extended position of the nozzle-portions only a flow of air through the space between the nozzle-portions and said inner skin.

10. A jet-nozzle arrangement as claimed in claim 9, having said first sealing means comprising a flange projecting from a skin of said jet pipe and located to be abutted by the nozzle-portions in their fully-retracted position to close said inlets to the air passages in the nozzle portions.

11. A jet-nozzle arrangement as claimed in claim 10, wherein said nozzle-portions each comprise inner and outer sheet metal walls interconnected by leading and trailing sheet metal end walls, said inlets being formed in the leading end wall and said outlets being formed in the trailing end wall, and having said flange arranged to abut said leading end wall in the fully-retracted position of said nozzle-portions.

12. A jet-nozzle arrangement as claimed in claim 9, having said second sealing means comprising an outwardly-directed flange on the inner jet pipe skin and a shoulder on the inner surface of each nozzle portion located to abut against said flange in the fully-extended position of the nozzle-portions.

13. A jet-nozzle arrangement as claimed in claim 9, comprising a third sealing means comprising a resilient strip carried by said outer skin and engaged with the external surfaces of said nozzle-portions in all positions of adjustment thereof.

14. A jet-nozzle arrangement as claimed in claim 8, wherein the adjacent circumferentially-facing ends of the nozzle-portions are cut away to leave tapering gaps between them in the fully-retracted position of the nozzle-portions and there are provided blanking-pieces extending across the gaps, which blanking-pieces are arranged to telescope into the nozzle-portions when they are moved to their fully-extended position.

15. A jet-nozzle arrangement as claimed in claim 14, wherein the blanking-pieces are U-form sheet metal elements whereof each has its open ends firmly engaged within the circumferentially-facing ends of one nozzle-portion and has its base slidingly engaged within the adjacent circumferentially-facing end of the other nozzle-portion.

16. In a gas motivated power plant having a generally tubular casing structure terminating in a gas jet discharge nozzle, the combination therewith of a substantially tubular ejector section of larger diameter telescoped about said casing structure and spaced outwardly thereof to provide a generally annular ejector passage, said passage having an annular upstream entryway disposed relatively remote from said nozzle and an outlet opening adjacent said nozzle, and a plurality of cooperatively movable lid elements pivotally mounted on said casing structure adjacent said nozzle, said lid elements having separate passages formed therein in communication with said outlet of the ejector passage and with the flow area of said nozzle, said lid elements being movable partially into said nozzle flow area for restricting gas flow therethrough while facilitating suction of cooling air from the entryway of said annular ejector passage through said separate passages into the gas stream discharged by way of said nozzle.

17. In a jet-nozzle arrangement for a gas turbine propulsion unit of the class comprising a jet pipe and an adjustable nozzle structure in the outlet end of the pipe, a construction of said jet pipe and adjustable nozzle structure which comprises an inner jet pipe skin, and outer jet pipe skin around the inner skin and spaced therefrom to afford between the skins an annular air space extending lengthwise of the jet pipe, there being an air inlet into said annular air space and an air outlet from said annular air space adjacent the outlet end of the jet pipe, adjustable nozzle-portions mounted on the end of the jet pipe to be movable from a fully extended position into said annular air space to vary the effective area of the nozzle, the leading part of the nozzle portions being always accommodated in said air space, said adjustable nozzle portions having spaced inner and outer walls forming therebetween air passages leading from inlets in the leading parts of the nozzle portions to outlets adjacent the exhaust gas stream carried by the jet nozzle arrangement, and cooperating gas sealing parts on said inner jet pipe skin and said adjacent inner walls of the nozzle portions which gas sealing parts co-operate at least when the nozzle portions are in said fully extended position to prevent a flow of air from said annular air space between the nozzle portions and said inner jet pipe skin but to permit a flow of air through said air passages in the nozzle portions from said annular air space to the outlets from said air passages in the nozzle portions.

18. In a gas motivated power plant having a generally tubular casing structure terminating in a gas jet discharge nozzle, the combination therewith of a substantially tubular ejector section of larger diameter telescoped about said casing structure and spaced outwardly thereof to provide a generally annular ejector passage, said passage having an annular upstream entryway disposed relatively remote from said nozzle and an outlet opening adjacent said nozzle, and a plurality of cooperatively movable lid elements pivotally mounted on said casing structure adjacent said nozzle, said lid elements having separate passages formed therein in communication with said outlet of the ejector passage and with the flow area of said nozzle, said lid elements being movable partially into said nozzle flow area for restricting gas flow therethrough while facilitating suction of cooling air from the entryway of said annular ejector passage through said separate passages into the gas stream discharged by way of said nozzle, said lid elements being retractible outwardly into said annular ejector passage for increasing the flow area of said nozzle while still maintaining flow of cooling air through said ejector passage.

19. In a gas motivated power plant having a generally tubular casing structure terminating in a gas jet discharge nozzle, the combination therewith of a substantially tubular ejector section of larger diameter telescoped about said casing structure and spaced outwardly thereof to provide a generally annular ejector passage, said passage having an annular upstream entryway disposed relatively remote from said nozzle and an outlet opening adjacent said nozzle, and a plurality of cooperatively movable lid elements pivotally mounted on said casing structure, adjacent said nozzle, each of said lid elements comprising parallel inner and outer walls and interposed spacing members forming an arcuate passage communicating at the upstream end with said outlet of said ejector passage, the downstream end of the arcuate passage in each lid element venting into the flow area of said nozzle, said lid elements being jointly operative for effecting flow of cooling air from said entryway through said annular ejector passage and said arcuate passages into the jet of gases discharged by way of said nozzle.

References Cited in the file of this patent

UNITED STATES PATENTS

| 1,572,812 | Rees | Feb. 9, 1926 |

FOREIGN PATENTS

| 586,571 | Great Britain | Mar. 24, 1947 |
| 588,501 | Great Britain | May 27, 1947 |

OTHER REFERENCES

"Aircraft Engineering," December 1945, loose leaf of drawings accompanying article on pages 342–347.

"Flight," February 6, 1947, drawing on page 145 of article by F. C. Sheffield on pages 142–145.

Koenig et al., abstract of application Serial No. 770,836, published November 1, 1949, 628 O. G. 256.